US012285802B2

(12) United States Patent
Tanigawa et al.

(10) Patent No.: US 12,285,802 B2
(45) Date of Patent: Apr. 29, 2025

(54) METHOD OF MANUFACTURING ADDITIVELY MANUFACTURED OBJECT

(71) Applicant: MITSUBISHI HEAVY INDUSTRIES, LTD., Tokyo (JP)

(72) Inventors: Shuji Tanigawa, Tokyo (JP); Masaya Hatanaka, Tokyo (JP); Ryuta Ito, Tokyo (JP); Hiroshi Makigano, Tokyo (JP); Taro Tokutake, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 303 days.

(21) Appl. No.: 17/731,811

(22) Filed: Apr. 28, 2022

(65) Prior Publication Data

US 2022/0371093 A1 Nov. 24, 2022

(30) Foreign Application Priority Data

May 18, 2021 (JP) ................................ 2021-083983

(51) Int. Cl.
*B22F 10/62* (2021.01)
*B23H 1/04* (2006.01)
(Continued)

(52) U.S. Cl.
CPC ............... *B22F 10/62* (2021.01); *B23H 1/04* (2013.01); *B33Y 10/00* (2014.12); *B33Y 40/20* (2020.01); *C23F 1/02* (2013.01)

(58) Field of Classification Search
CPC .......... B22F 10/20; B22F 10/62; B22F 10/66; B22F 2003/241; B22F 2003/247; B22F 2202/06; B22F 2999/00; B22F 5/006; B22F 5/009; B23H 1/04; B23H 11/00; B23H 7/265; B23H 9/10; B23H 9/14; B33Y 40/20; B33Y 80/00; B33Y 50/00; B33Y 50/02; C23F 1/02; C23F 3/00; C23F 3/06; Y02P 10/25; B29C 64/386; B29C 64/393; B29C 64/153
See application file for complete search history.

(56) References Cited

U.S. PATENT DOCUMENTS

2019/0145010 A1 5/2019 Diaz et al.
2019/0178086 A1 * 6/2019 Franke ...................... B22F 5/04
2022/0049612 A1 2/2022 Tokutake et al.

FOREIGN PATENT DOCUMENTS

GB 2275341 A * 8/1994 ............ G01M 99/00
JP 59-12529 1/1984
(Continued)

OTHER PUBLICATIONS

Office Action dated Aug. 6, 2024 in corresponding Japanese Patent Application No. 2021-083983, with Machine Translation.

*Primary Examiner* — Philip C Tucker
*Assistant Examiner* — Jimmy R Smith, Jr.
(74) *Attorney, Agent, or Firm* — Wenderoth, Lind & Ponack, L.L.P.

(57) ABSTRACT

A method of manufacturing an additively manufactured object includes: checking, for an additively manufactured object including a plurality of internal passages, the presence or absence of a deposit in each inner wall surface of the plurality of internal passages; and selectively removing the deposit from the internal passage in which the deposit has been detected in the checking, among the plurality of internal passages.

6 Claims, 14 Drawing Sheets

(51) Int. Cl.

| | |
|---|---|
| ***B33Y 10/00*** | (2015.01) |
| ***B33Y 40/20*** | (2020.01) |
| ***C23F 1/02*** | (2006.01) |

(56) References Cited

FOREIGN PATENT DOCUMENTS

| | | |
|---|---|---|
| JP | 2018-534411 | 11/2018 |
| JP | 2019-512049 | 5/2019 |
| JP | 2020-165359 | 10/2020 |
| JP | 2020-165360 | 10/2020 |

* cited by examiner

METHOD OF MANUFACTURING ADDITIVELY MANUFACTURED OBJECT

CROSS-REFERENCE TO RELATED APPLICATIONS

This application claims the benefit of priority to Japanese Patent Application Number 2021-083983 filed on May 18, 2021. The entire contents of the above-identified application are hereby incorporated by reference.

TECHNICAL FIELD

The disclosure relates to a method of manufacturing an additively manufactured object.

RELATED ART

A product including an internal passage may be manufactured by additive manufacturing.

For example, JP 2020-165360 A discloses forming, by an additive process, a turbine component including a plurality of cooling passages through which a cooling medium flows.

SUMMARY

An unintended deposit may adhere to an inner wall surface of an internal passage of an additively manufactured object. Examples of the intended deposit include sputter or sintered metal powder generated during manufacturing the additively manufactured object, or foreign matter (soot, dust, or the like) entering the internal passage during operation of a product using the additively manufactured object. In cooling the additively manufactured object by supplying fluid to the internal passage, it is desirable to remove the deposit, to prevent a deterioration of fluid characteristics (for example, an increase in pressure loss) in the internal passage due to the deposit described above and resulting decrease in cooling performance.

In order to remove the deposit adhering to the inner wall surface of the internal passage of the additively manufactured object, a technique of chemically polishing the surface of the additively manufactured object by immersing the additively manufactured object in a chemical etchant may be used. However, in this case, the inner wall surfaces of all the internal passages are smooth, and the satisfactory heat transfer promoting effect due to the appropriate surface roughness obtained by additive manufacturing may be impaired.

In view of the foregoing, at least one embodiment of the disclosure is intended to provide a method of manufacturing an additively manufactured object capable of effective cooling.

A method of manufacturing an additively manufactured object according to at least one embodiment of the disclosure includes: checking, for an additively manufactured object including a plurality of internal passages, the presence or absence of a deposit in each inner wall surface of the plurality of internal passages; and selectively removing the deposit for the internal passage having detected the presence of the deposit in the checking among the plurality of internal passages.

According to at least one embodiment of the disclosure, there is provided a method of manufacturing an additively manufactured object capable of effective cooling.

BRIEF DESCRIPTION OF DRAWINGS

The disclosure will be described with reference to the accompanying drawings, wherein like numbers reference like elements.

Figure 6C:
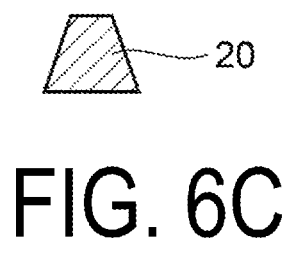
Figure 6D:
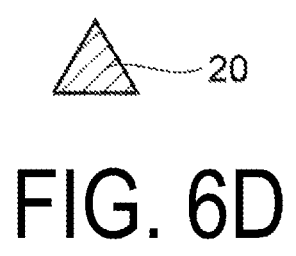
Figure 6E:
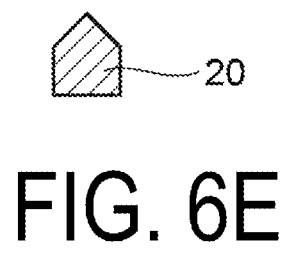

FIG. 6C is a diagram illustrating an example of a cross section of an electrode used in electrical discharge machining.

FIG. 6D is a diagram illustrating an example of a cross section of an electrode used in electrical discharge machining.

FIG. 6E is a diagram illustrating an example of a cross section of an electrode used in electrical discharge machining.

DESCRIPTION OF EMBODIMENTS

Figure 1:
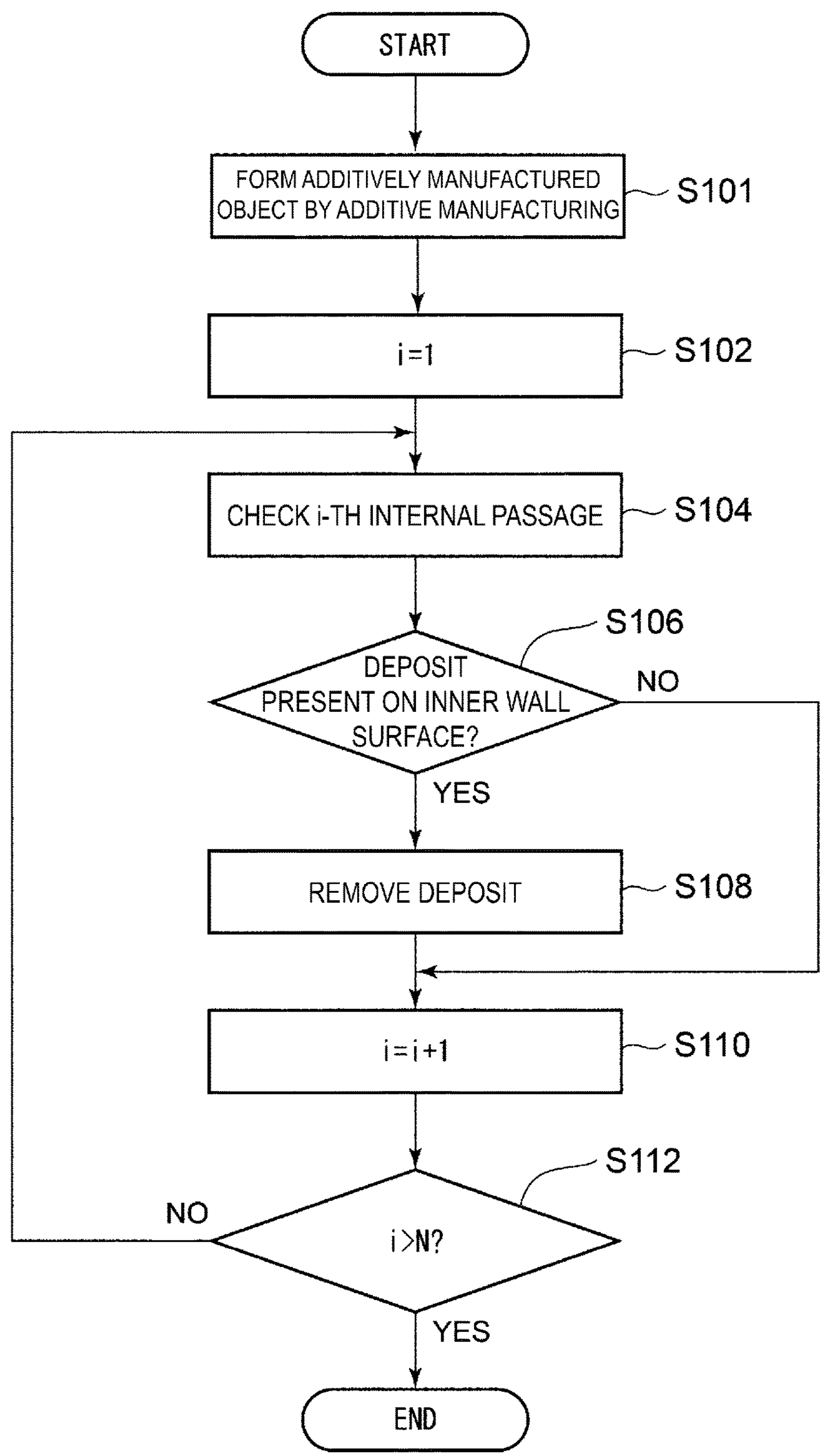
FIG. 1 is a flowchart of a method of manufacturing an additively manufactured object according to one embodiment.

Some embodiments of the disclosure will be described below with reference to the attached drawings. It is intended, however, that dimensions, materials, shapes, relative arrangements or the like of components described in the embodiments or illustrated in the drawings are only examples and not intended to limit the scope of the disclosure to them.

Method of Manufacturing Additively Manufactured Object

FIG. 1 is a flowchart of a method of manufacturing an additively manufactured object according to one embodiment. As illustrated in FIG. 1, a method of manufacturing an additively manufactured object according to one embodiment includes: forming an additively manufactured object by additive manufacturing (S101); and removing deposits adhering to an inner wall surface of an internal passage in the additively manufactured object (S102 to S112).

Figure 2:
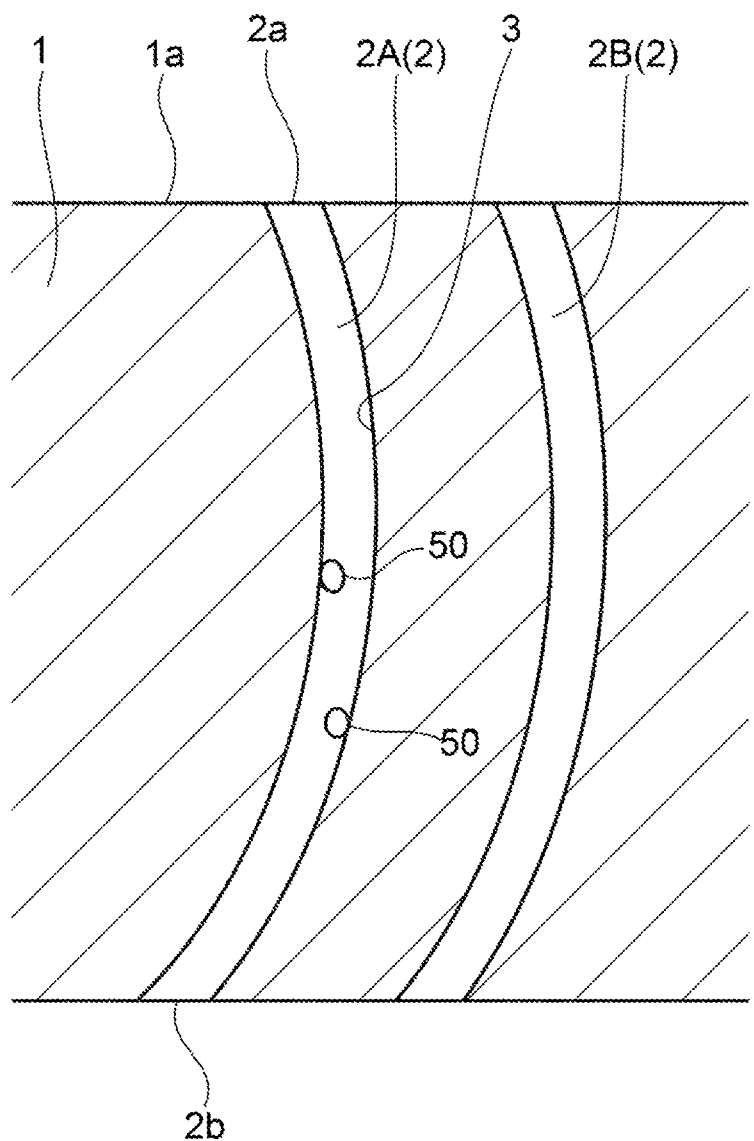
FIG. 2 is a schematic diagram illustrating an example of a cross section of an additively manufactured object.

FIG. 2 is a schematic diagram illustrating an example of a cross section of an additively manufactured object formed in step S101. In step S101, a metallic additively manufactured object 1 including a plurality of internal passages 2 is formed by additive manufacturing. The additively manufactured object 1 may be a component of a device that becomes high temperature in use, such as a gas turbine, a steam turbine, a compressor, a turbocharger, a flying object, or a rocket engine. The additively manufactured object 1 may be a turbine blade or a ring segment of a gas turbine or a steam turbine. Each of the internal passages 2 may be a passage for flowing cooling fluid to cool the additively manufactured object 1.

The powder bed fusion (PBF) method (hereinafter also referred to as "PBF method") or directed energy deposition (DED) method (hereinafter also referred to as "DED method") may be used as the additive manufacturing technique in step S101.

In the PBF method, a shaped body of a desired shape is formed by repeating an operation of laying metal powder and an operation of selectively melting and solidifying a portion to be shaped by, for example, a laser beam or an electron beam serving as a heat source.

In the DED method, a metal powder is simultaneously supplied and irradiated with, for example, a laser beam or an electron beam serving as a heat source, and the metal powder is melted and solidified at an arbitrary position and layered to form a shaped body having a desired shape.

An inner wall surface 3 of an internal passage 2 and an surface 1*a* of the additively manufactured object 1 (see FIG. 2) that is formed by additive manufacturing have slightly rough surfaces rather than completely smooth surfaces. Since the inner wall surface 3 of the internal passage 2 has an appropriate surface roughness, the heat transfer effect between the cooling fluid and the additively manufactured object 1 through the inner wall surface 3 is enhanced. That is, from the viewpoint of effectively cooling the additively manufactured object 1, it is advantageous that the inner wall surface 3 of the internal passage 2 has some surface roughness as compared with the case where the inner wall surface 3 is a completely smooth surface.

Each of the plurality of internal passages 2 has at least one opening that opens on the surface 1*a* of the additively manufactured object 1. In the exemplary embodiment illustrated in FIG. 2, the internal passage 2 has two openings 2*a* and 2*b* that open to the surface 1*a* of the additively manufactured object 1. These openings 2*a* and 2*b* may function as an inlet or an outlet of the cooling fluid in the internal passage 2 of the additively manufactured object 1 during operation of an apparatus (gas turbine, or the like) formed of the additively manufactured object 1.

An equivalent diameter (hydraulic diameter) of the internal passage 2 may be 5 mm or less, or may be from 0.5 mm to 2 mm.

Each of a plurality of internal passages 2 may include a bent portion. Here, the term "passage including the bent portion" means a passage including a curved portion or a bent portion, not a linear passage, and the passage including the bent portion includes a passage in which a plurality of linear portions are connected via the curved portions or the bent portions. In the example illustrated in FIG. 2, the plurality of internal passages 2 each have curved shapes. In step S101, by using an additive manufacturing technique, an additively manufactured object 1 including an internal passage 2 having a relatively complex shape including a bent portion can be formed. The cross section shape and the equivalent diameter of each of the internal passages 2 may be changed in the middle of the passage.

An unintended deposit 50 may adhere to the inner wall surface 3 of the internal passage 2 of the additively manufactured object 1 (see FIG. 2). Such unintended deposit 50 may be, for example, sputter or sintered metal powder generated during manufacturing the additively manufactured object 1, or foreign matter (soot, dust, or the like) entering the internal passage 2 during operation of a product (such as a gas turbine) using the additively manufactured object 1.

In steps S102 to S112, each of the plurality of internal passages 2 of the additively manufactured object 1 is checked for the presence of the deposit 50 on the inner wall surface 3 (S104), and the deposit 50 is selectively removed in the internal passage in which the deposit 50 has been detected on the inner wall surface 3 (S106 to S108).

More specifically, when a total of N internal passages 2 are formed in the additively manufactured object 1, the first internal passage 2 is first checked (S102) to determine whether the deposit 50 is present on the inner wall surface 3 (S104). In step S104, for example, the presence or absence of the deposit 50 may be confirmed by inserting a camera such as a borescope into the internal passage 2 to image the inside of the internal passage 2 or by inserting a wire or the like into the internal passage 2. At this time, the position (for example, the depth from the opening 2*a*) of the deposit 50 may be measured using a borescope, a wire, or the like.

When the deposit 50 is detected on the inner wall surface in step S104 (YES in step S106), the deposit 50 is removed from the inner wall surface 3 (S108). In step S108, the deposit 50 can be removed by, for example, electrical discharge machining or chemical polishing (more details will be described later). When the deposit 50 is not detected on the inner wall surface (NO in S106), the processing proceeds to the next step without doing anything. Then, the series of steps S104 to S108 are repeated from the first internal passage 2 to the N-th internal passage 2 (S110, S112). In this way, the additively manufactured object 1 in which the deposits 50 have been removed from the plurality of internal passages 2 of the additively manufactured object 1 can be obtained.

More specifically, in the example illustrated in FIG. 2, the internal passage 2A and the internal passage 2B are formed in the additively manufactured object 1. First, for the first internal passage 2A (S102), it is checked whether the deposit 50 is present on the inner wall surface 3 (S106). As a result, since the deposits 50 are detected on the inner wall surface (YES in S106), the deposits 50 are removed (S108). Next, for the second internal passage 2B (S110, S112), it is checked whether the deposit 50 is present on the inner wall surface 3 (S106). As a result, since no deposit 50 is detected on the inner wall surface (NO in S106), this flow is terminated.

The method described above checks, for the additively manufactured object 1 including a plurality of internal passages 2, the presence or absence of the deposit 50 on each inner wall surface 3 of the plurality of internal passages 2 and selectively removes the deposit 50 from the internal passage 2 in which the deposit 50 has been detected. In this manner, for the internal passage 2 in which the deposit 50 is present, among the plurality of internal passages 2, the deterioration in the fluid characteristics due to the deposit 50 in the internal passage 2 (for example, increase in pressure loss) can be prevented by removing the deposit 50. Since the deposit removal processing is not performed for the internal passage 2 in which no deposit 50 is present, among the plurality of internal passages 2, the heat transfer promoting effect due to the surface roughness of the inner wall surface 3 of the internal passage obtained by additive manufacturing can be maintained. As a result, the method described above enables effective cooling of the additively manufactured object 1 by supplying the cooling fluid to the plurality of internal passages 2.

Figure 3:
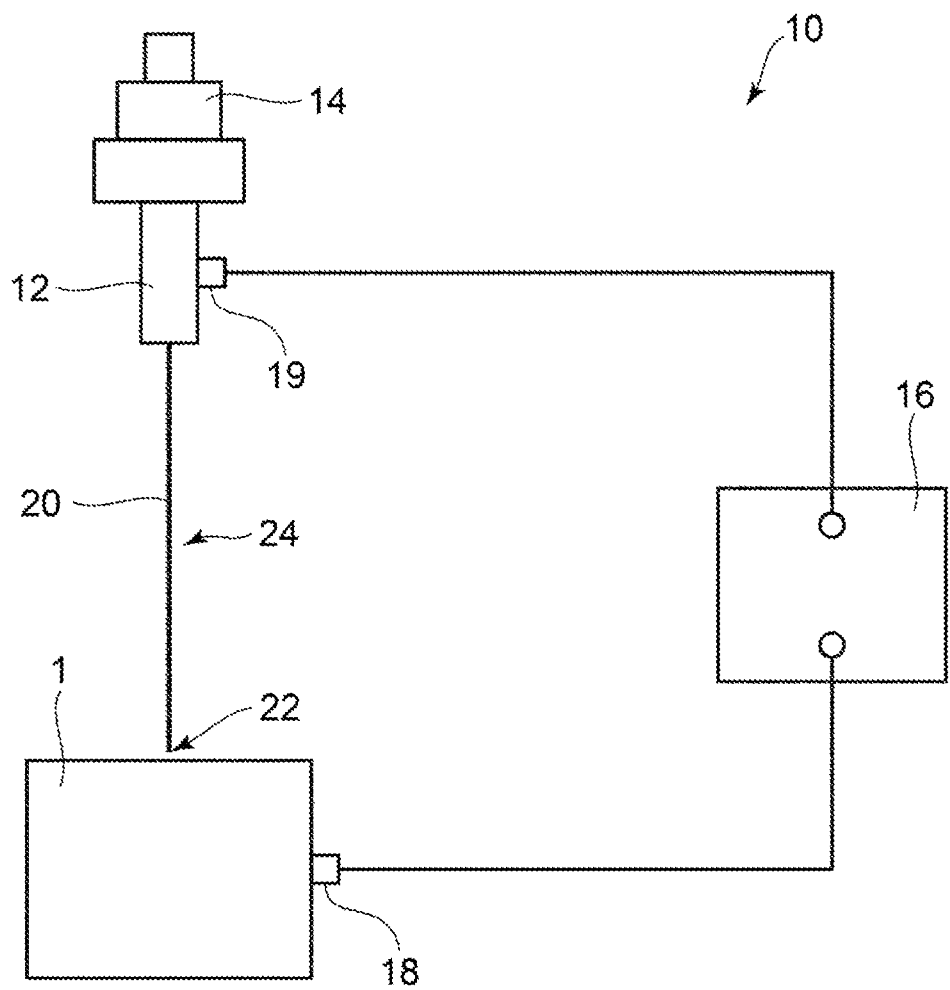
FIG. 3 is a schematic diagram of an electrical discharge machining apparatus used for removing deposits according to one embodiment.
Figure 4:
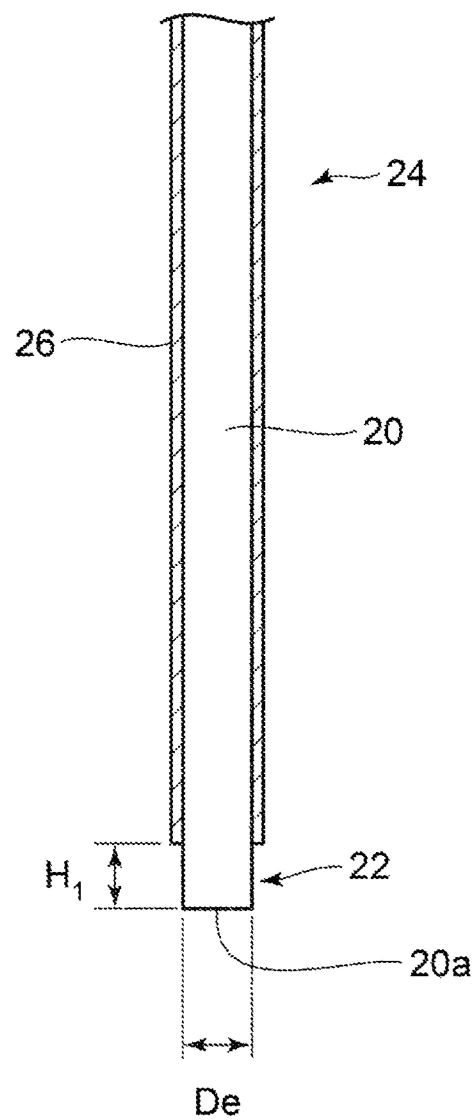
FIG. 4 is a diagram illustrating an example of an electrode used in electrical discharge machining.
Figure 5:
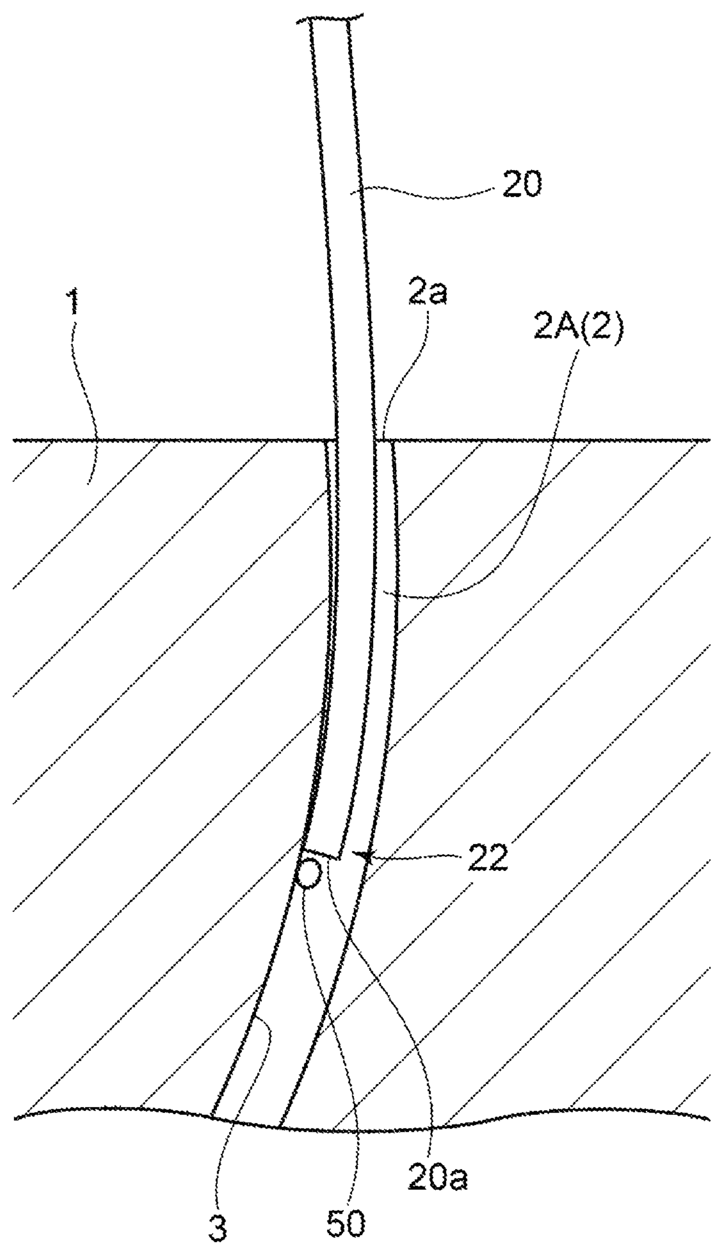
FIG. 5 is a diagram explaining a procedure for removing deposits by electrical discharge machining.
Figure 6A:
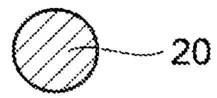
FIG. 6A is a diagram illustrating an example of a cross section of an electrode used in electrical discharge machining.
Figure 6B:
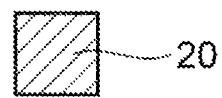
FIG. 6B is a diagram illustrating an example of a cross section of an electrode used in electrical discharge machining.

FIG. 3 is a schematic diagram of an electrical discharge machining apparatus used in deposit removal according to one embodiment. FIG. 4 is a diagram illustrating an example of an electrode used in electrical discharge machining. FIG. 5 is a diagram explaining a procedure for removing deposits by electrical discharge machining.

According to one embodiment, in step S108, the deposits 50 are removed by performing electrical discharge machining using an electrode 20 including a base portion 24 covered with an insulating material and a tip portion 22 exposed without being covered with an insulating material. In step S108, for example, electrical discharge machining may be performed using the electrical discharge machining apparatus illustrated in FIG. 3. The electrical discharge machining apparatus 10 illustrated in FIG. 3 includes an electrode 20, a gripping portion 12 that grips the electrode 20, an electrode feeder 14, and a DC power supply 16.

As illustrated in FIG. 4, the electrode 20 used in electrical discharge machining includes a base portion 24 covered with an insulating material 26 (for example, varnish) and a tip portion 22 exposed without being covered with an insulating material. As illustrated in FIG. 3, the electrode 20 has a long shape that can be inserted into the internal passage 2 of the additively manufactured object 1. An enameled wire may be used as the electrode 20.

The diameter De (equivalent diameter) of the electrode 20 may be smaller than the diameter (equivalent diameter) of the internal passage 2 of the additively manufactured object 1 to be processed and may be, for example, 0.3 mm to 1.0 mm. The length H1 of the tip portion 22 of the electrode 20 may be 0 to 2 times the diameter De of the electrode 20.

The electrode feeder 14 is formed so as to adjust the insertion amount of the electrode 20 with respect to the internal passage 2 of the additively manufactured object 1. The electrode feeder 14 may include, for example, an actuator for moving the gripping portion 12, and may adjust the feed amount of the electrode 20 by moving the electrode 20 through the gripping portion 12.

The DC power supply 16 is formed so as to apply a DC voltage between the electrode 20 and the additively manufactured object 1. One terminal of the DC power supply 16 is connected to the additively manufactured object 1 through a terminal 18 provided in the additively manufactured object 1. The other terminal of the DC power supply 16 is connected to the electrode 20 via a terminal 19 attached to the gripping portion 12.

Referring to FIG. 5, a procedure for removing the deposit 50 by using the electrical discharge machining apparatus 10 described above will be described. First, the electrode feeder 14 is operated to insert the electrode 20 from the tip portion 22 along the internal passage 2 of the additively manufactured object 1, and the tip portion 22 of the electrode 20 is brought close to the deposit 50 on the inner wall surface 3 of the internal passage 2. With the distance between the tip 20*a* (tip portion 22) of the electrode 20 and the deposit 50 maintained at a predetermined value or more (for example, 0.1 mm or more), the DC voltage is applied between the electrode 20 and the additively manufactured object 1 by the DC power supply 16 to start electrical discharge machining to remove the deposit 50 from the inner wall surface 3.

The method described above performs electrical discharge machining using the electrode 20 including the base portion 24 covered with the insulating material 26 and the exposed tip portion 22. In this manner, by positioning the tip portion 22 of the electrode 20 near the deposit 50 in the internal passage 2, it is possible to locally discharge at a position where the deposit 50 adheres in the internal passage 2 while suppressing a short circuit between the base portion 24 of the electrode 20 and the inner wall surface 3 of the internal passage 2. Thus, the deposits 50 can be removed while reducing the risk of damaging other portions of the internal passage 2. As a result, for example, the components which must be disposed due to the damage caused by electrical discharge machining can be reduced, and the cost can be reduced.

In performing electrical discharge machining as described above, the deposits 50 adhering to the inner wall surface 3 of the internal passage 2 may be removed by performing electrical discharge machining in a state in which at least a part of the base portion 24 and the tip portion 22 of the electrode 20 are inserted into the internal passage 2.

In this case, electrical discharge machining is performed in a state in which at least a part of the base portion 24 and the tip portion 22 are inserted into the internal passage 2. In this manner, by positioning the tip portion 22 of the electrode 20 near the deposit 50 in the internal passage 2, it is possible to locally discharge at a position where the deposit 50 adheres in the internal passage 2 while suppressing a short circuit between the base portion 24 of the electrode 20 and the inner wall surface 3 of the internal passage 2. Thus, the deposits 50 can be removed while reducing the risk of damaging other portions of the internal passage 2.

The electrode 20 for performing electrical discharge machining may be a deformable long electrode.

By using such a deformable long electrode, the electrode 20 can be deformed according to the shape of the internal passage 2. Thus, even when the internal passage 2 has a complicated shape, the electrode 20 can be smoothly inserted into the internal passage 2 to position the tip portion 22 of the electrode 20 near the deposit 50.

The electrode 20 for performing electrical discharge machining may be formed by additive manufacturing. As a material of the electrode 20, a metal having good electric conductivity can be preferably used. As a material of the electrode 20, for example, copper, copper alloy, or aluminum alloy can be used.

The internal passage 2 of the additively manufactured object 1 formed by additive manufacturing may have various shapes. In this respect, as described above, by forming the electrode 20 used in electrical discharge machining by additive manufacturing, the electrode 20 having a shape corresponding to the internal passage 2 can be manufactured. Thus, by inserting the thus created electrode 20 into the internal passage 2, the tip portion 22 of the electrode 20 can be smoothly positioned near the deposit 50.

Each of FIGS. 6A to 6E is a diagram illustrating an example of a cross section of the electrode 20 for performing electrical discharge machining. The cross section shapes of the electrodes 20 illustrated in FIGS. 6A to 6E are circular, rectangular, trapezoidal, triangular, and house-shaped, respectively. However, the cross section shape of the electrode 20 is not limited to these examples, and the electrode 20 having a shape corresponding to the shape of the internal passage 2 of the additively manufactured object 1 can be manufactured.

Figure 7:
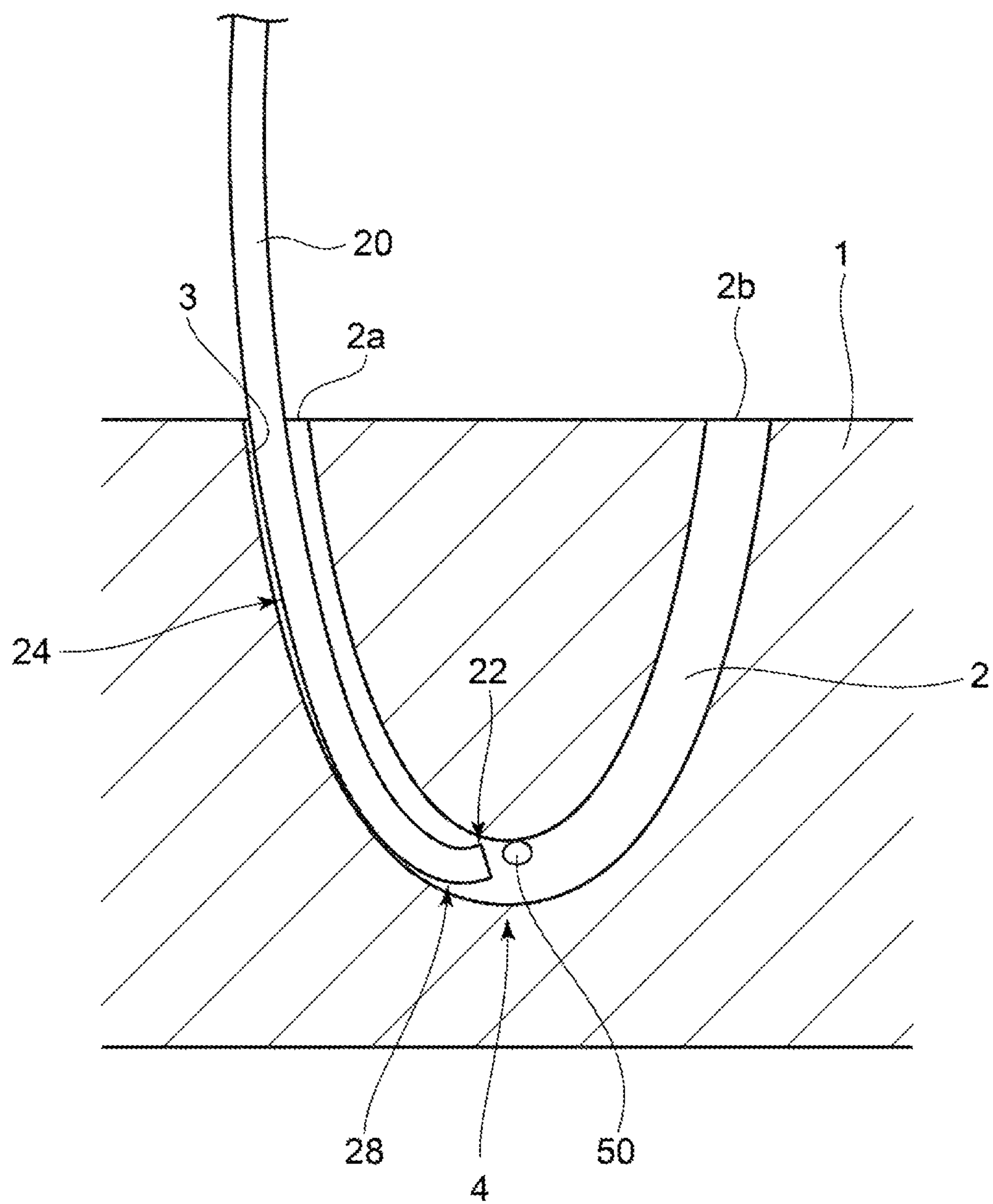
FIG. 7 is a diagram explaining a procedure for removing deposits by electrical discharge machining.

FIG. 7 is a diagram explaining a procedure for removing deposits 50 by electrical discharge machining. As illustrated in FIG. 7, a portion 28 including the tip portion 22 of the electrode 20 for performing electrical discharge machining has a curved shape. For example, the radius of curvature of the center line of the electrode 20 at the portion 28 is less than the radius of curvature of the electrode 20 at the base portion 24.

For example, when the diameter of the electrode 20 is relatively large as compared with the diameter of the internal passage 2, or when the radius of curvature of the curved portion of the internal passage 2 is small, the electrode 20 may not be bent enough when the electrode 20 is inserted into the internal passage 2, and the tip portion 22 of the electrode 20 may not easily reach the position of the deposit 50. In this regard, as described above, since the portion including the tip portion 22 of the electrode 20 has a curved shape, the tip portion 22 of the electrode 20 can reach the position of the deposit 50 even when the base portion 24 of the electrode 20 does not bend significantly.

Figure 8:
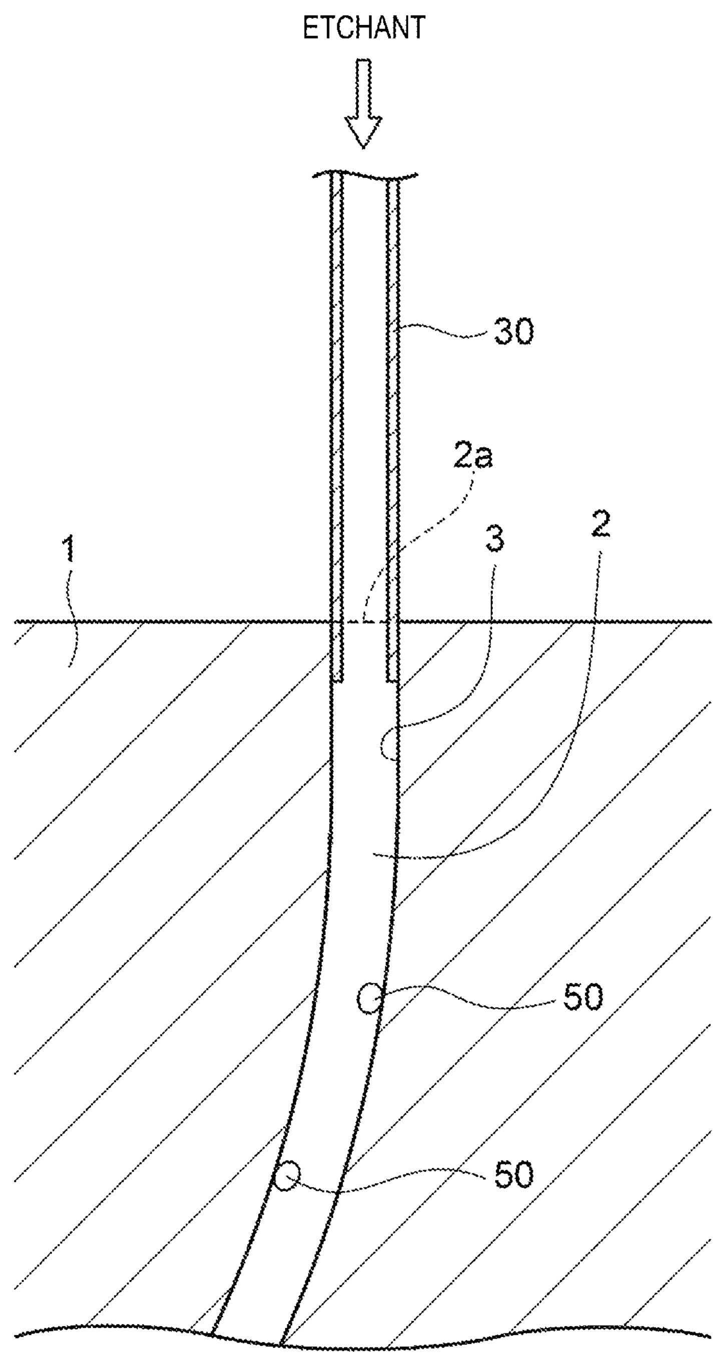
FIG. 8 is a diagram explaining a procedure for removing deposits by chemical polishing.

FIG. 8 is a diagram illustrating a procedure for removing the deposit 50 by chemical polishing. According to one embodiment, in step S108, the deposit 50 adhering to the inner wall surface 3 of the internal passage 2 is removed by supplying an etchant into the internal passage 2 of the additively manufactured object 1 to perform chemical polishing.

For removing the deposit 50 by chemical polishing, first, one end of a tube 30 is inserted into a portion of the opening 2*a* in the internal passage 2 of the additively manufactured object 1. Then, the etchant is poured from the other end of the tube 30 and supplied into the internal passage 2 through the tube 30. In this way, the deposit 50 is dissolved and removed by the etchant. The temperature of the etchant is adjusted to a temperature suitable for chemical polishing.

As the etchant, one containing an acid, an alkali and a salt as a component can be used. By the redox reaction between the component of the etchant and the inner wall surface 3 of the internal passage 2 or the deposit 50, the surface portion of the inner wall surface 3 or the deposits 50 is dissolved, thereby removing the deposit 50 or reducing the size of the deposit 50. When the material of the additively manufactured object 1 is a Ni-based superalloy or a Co-based superalloy, a material containing ferric chloride as a main component can be used as the etchant.

The method described above makes it possible to certainly remove the deposit 50 adhering to the inner wall surface 3 of the internal passage 2 by selectively supplying an etchant to the internal passage 2 in which the deposit 50 has been detected, among the plurality of internal passages 2.

In some embodiments, after the supply of the etchant into the internal passage 2 is completed, the heat treatment of the additively manufactured object 1 may be performed at a temperature equal to or higher than the boiling point of the salt contained in the etchant. After the treatment with the etchant, the internal passage 2 may be washed with water or hot water before the heat treatment.

When an etchant containing ferric chloride as a main component is used, a part of ferric chloride is changed to ferrous chloride by a chemical reaction in etching. Ferric chloride has a boiling point of about 306° C., and ferrous chloride has a boiling point of about 1020° C. Thus, when this etchant is used, the temperature of the heat treatment after the etching treatment may be 1020° C., which is the boiling point of ferrous chloride, or higher.

In the method described above, since the heat treatment of the additively manufactured object 1 is performed at a temperature equal to or higher than the boiling point of the salt contained in the etchant after chemical polishing treatment using the etchant, the salt remaining after chemical polishing treatment can be effectively removed. Thus, the corrosion risk of the additively manufactured object 1 can be reduced.

Figure 9:
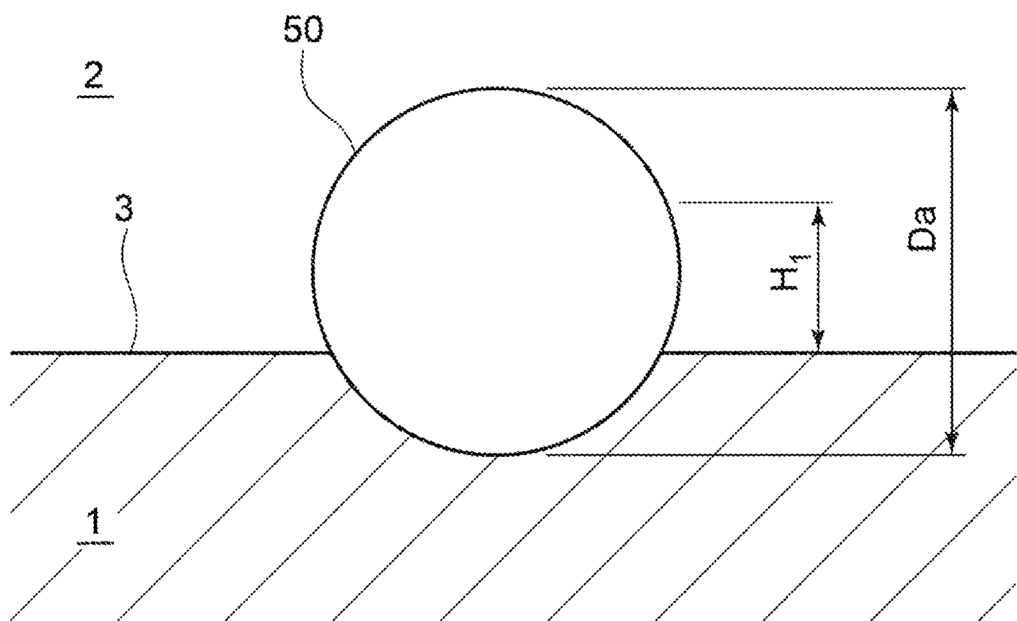
FIG. 9 is a schematic view of a deposit adhering to an inner wall surface of an internal passage in an additively manufactured object.

FIG. 9 is a schematic view of the deposit 50 adhering to the inner wall surface 3 of the internal passage 2 in the additively manufactured object 1.

In some embodiments, when the maximum diameter of the deposit 50 is denoted by Da, and an allowable height of the residue remaining on the inner wall surface 3 after removal of the deposit 50 is denoted by H1, the amount of the deposit 50 removed by chemical polishing is expressed as $(Da-H1)/2$ or less. Here, the removal amount of the deposit 50 is the removal amount of the deposit 50 in the height direction with respect to the inner wall surface 3.

In the method described above, since the removal amount of deposit 50 by chemical polishing is set to be $(Da-H1)/2$ or less, the deposit 50 adhering to the internal passage 2 can be sufficiently removed while reducing an increase in the time required for chemical polishing or reducing an increase in the thickness reduction amount of the inner wall surface 3 of the internal passage 2.

Figure 10:
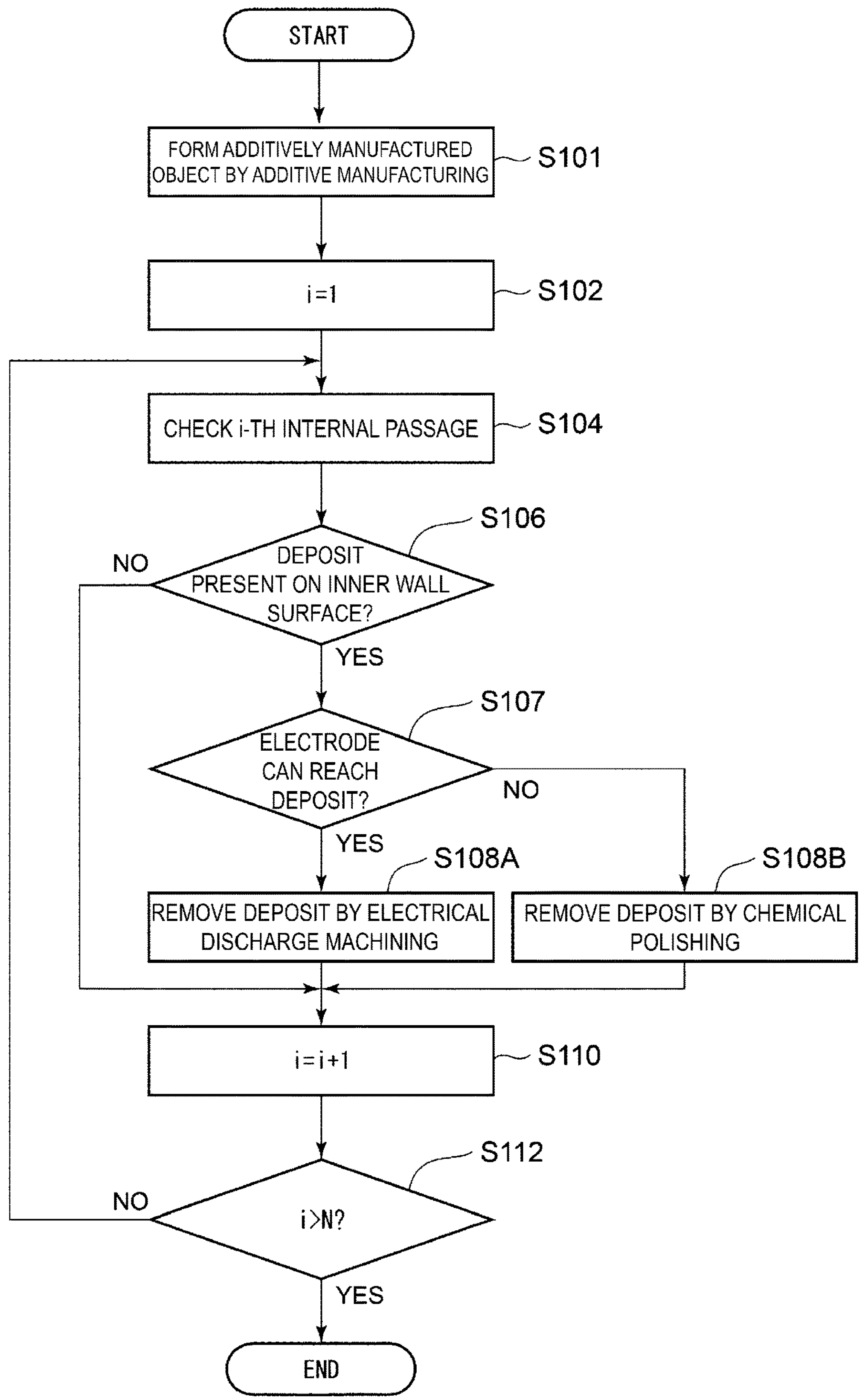
FIG. 10 is a flowchart of a method of manufacturing an additively manufactured object according to one embodiment.

FIG. 10 is a flowchart of a method of manufacturing an additively manufactured object according to one embodiment. The flowchart illustrated in FIG. 10 is basically the same as the flowchart illustrated in FIG. 1, and the same reference sign is attached to the step for performing the same procedure, and description thereof will be omitted. The flowchart illustrated in FIG. 10 differs from the flowchart illustrated in FIG. 1 in that step S107 is included for selecting whether to perform electrical discharge machining or chemical polishing for removing the deposit 50.

In the method according to the flowchart illustrated in FIG. 10, when the deposit 50 adhering to the inner wall surface of the internal passage 2 is detected in S104 to S106 (YES in S106), it is determined whether the tip portion of the electrode 20 used in electrical discharge machining can reach the deposit 50 in the internal passage 2 (S107). In step S107, it may be determined whether the deposit 50 in the internal passage 2 can be reached based on the shape of the internal passage 2 or by inserting the electrode 20 used in electrical discharge machining into the internal passage 2.

When it is determined in step S107 that the tip portion of the electrode 20 used in electrical discharge machining can reach the deposit 50 in the internal passage 2 (YES in S107), the deposit 50 in the internal passage 2 is removed by electrical discharge machining (S108A). When it is determined in step S107 that the tip portion of the electrode 20 used in electrical discharge machining cannot reach the deposit 50 in the internal passage 2 (NO in step S107), the deposit 50 in the internal passage 2 is removed by chemical polishing (S108B).

In the case of electrical discharge machining, since the deposit 50 is removed by performing local treatment in comparison with chemical polishing, surface roughness of the inner wall surface 3 of the internal passage 2 is easily maintained. In this respect, the method described above removes the deposit 50 by electrical discharge machining when it is possible to remove the deposit 50 by electrical discharge machining, or by chemical polishing when it is not possible to remove the deposit 50 by electrical discharge machining. Thus, the deposit 50 can be removed while maintaining the surface roughness of the inner wall surface 3 of the internal passage 2 obtained by additive manufacturing as much as possible. As a result, it is possible to effectively cool the additively manufactured object 1.

The contents described in each of the above-mentioned embodiments are understood as follows, for example.

(1) A method of manufacturing an additively manufactured object according to at least one embodiment of the disclosure includes: checking, for an additively manufactured object (1) including a plurality of internal passages (2), the presence or absence of a deposit (50) on each inner wall surface (3) of the plurality of internal passages (S102); and selectively removing the deposit for the internal passage in which the deposit has been detected in the checking among the plurality of internal passages (S106 to S108).

The method described in above (1) checks, for an additively manufactured object including a plurality of internal passages, the presence or absence of a deposit on each inner wall surface of the plurality of internal passages, and selectively removes the deposit from the internal passage in which the deposit has been detected. Thus, for an internal passage in which the deposit is present, among the plurality of internal passages, by removing the deposit, the deterioration of the fluid characteristics (for example, increase in pressure loss) due to the deposit in the internal passage can be reduced. Since the deposit removal processing is not performed for the internal passage in which no deposit is present, among the plurality of internal passages, the heat transfer promoting effect due to the surface roughness of the inner wall surface of the internal passage obtained by additive manufacturing can be maintained. Thus, the method described in above (1) enables effective cooling of the additively manufactured object by supplying cooling fluid to the plurality of internal passages.

(2) In some embodiments, in the method described in above (1), each of the plurality of internal passages includes a bent portion.

In additive manufacturing, an additively manufactured object including an internal passage having a relatively complex shape including a bent portion can be formed. The method described in above (2) checks, for an additively manufactured object including an internal passage having a relatively complex shape including a bent portion, the presence or absence of a deposit in each inner wall surface of the plurality of internal passages and selectively removes the deposit from the internal passage in which the deposit has been detected. As a result, as described in above (1), by supplying cooling fluid to the plurality of internal passages, it is possible to effectively cool an additively manufactured object.

(3) In some embodiments, in the method described in above (1) or (2), in the removing, the deposit adhering to the inner wall surface of the internal passage is removed by performing electrical discharge machining using an electrode (20) including a base portion (24) covered with an insulating material (26) and a tip portion (22) exposed without being covered with an insulating material.

The method described in above (3) performs electrical discharge machining using an electrode including a base portion covered with an insulating material and an exposed tip portion. Thus, by positioning the tip portion of the electrode near the deposit in the internal passage, it is possible to locally discharge at a position where the deposit adheres in the internal passage while suppressing a short circuit between the base portion of the electrode and the inner wall surface of the internal passage. As a result, the deposit can be removed while reducing the risk of damaging other portions of the internal passage.

(4) In some embodiments, in the configuration described in above (3), the deposit adhering to the inner wall surface of the internal passage is removed by performing electrical discharge machining in a state in which at least a part of the base portion and the tip portion are inserted into the internal passage.

According to the configuration described in above (4), electrical discharge machining is performed in a state in which at least a part of the base portion and the tip portion are inserted into the internal passage. Thus, by positioning the tip portion of the electrode near the deposit in the internal passage, it is possible to locally discharge at a position where the deposit adheres in the internal passage while suppressing a short circuit between the base portion of the electrode and the inner wall surface of the internal passage. As a result, the deposit can be removed while reducing the risk of damaging other portions of the internal passage.

(5) In some embodiments, in the method described in above (3) or (4), the electrode is a deformable long electrode.

The method described in above (5) can deform the electrode according to the shape of the internal passage by using a deformable long electrode. Thus, even when the internal passage has a complicated shape, the electrode can be smoothly inserted into the internal passage to position the tip portion of the electrode near the deposit.

(6) In some embodiments, in any of the methods described in above (3) to (5), the electrode is an electrode formed by additive manufacturing.

The internal passage of the additively manufactured object formed by additive manufacturing may have various shapes.

In this respect, the method described in above (6) forms the electrode to be used in electrical discharge machining by additive manufacturing. Thus, by manufacturing an electrode having a shape corresponding to the internal passage by additive manufacturing, the tip portion of the electrode can be positioned near a deposit by inserting the electrode into the internal passage.

(7) In some embodiments, in any of the methods described in above (3) to (6), a portion (28) including the tip portion of the electrode has a curved shape.

For example, when the diameter of the electrode is relatively large as compared with the diameter of the internal passage, or when the radius of curvature of the curved portion of the internal passage is small, the electrode may not be bent enough when the electrode is inserted into the internal passage, and the tip portion of the electrode may not easily reach the position of the deposit. In the method described in above (7), since the tip portion of the electrode has a curved shape, the tip portion of the electrode can reach the position of the deposit even when the base portion of the electrode does not bend significantly.

(8) In some embodiments, in the method described in above (1) or (2), in the removing, the deposit adhering to the inner wall surface of the internal passage is removed by supplying an etchant into the internal passage and performing chemical polishing.

The method described in above (8) makes it possible to certainly remove the deposit adhering to the inner wall surface of the internal passage by selectively supplying an etchant to the internal passage in which the deposit has been detected, among the plurality of internal passages.

(9) In some embodiments, in the method described in above (8), after supplying the etchant into the internal passage, a heat treatment of the additively manufactured object is performed at a temperature equal to or higher than the boiling point of the salt content contained in the etchant.

In the method described in above (9), since the heat treatment of the additively manufactured object is performed at a temperature equal to or higher than the boiling point of the salt content contained in the etchant after chemical polishing treatment using the etchant, the salt content remaining after chemical polishing treatment can be effectively removed. Thus, the corrosion risk of the additively manufactured object can be reduced.

(10) In some embodiments, in the method described in above (8) or (9), when a maximum diameter of the deposit is denoted by Da, and an allowable height of the residue remaining on the inner wall surface after removal of deposit is denoted by H1, the amount of the deposit removed by the chemical polishing is expressed as (Da−H1)/2 or less.

In the method described in above (10), since the removal amount of deposit by chemical polishing is set to be (Da−H1)/2 or less, the deposit adhering to the internal passage can be sufficiently removed while reducing an increase in the time required for chemical polishing or reducing an increase in the thickness reduction amount of the inner wall surface of the internal passage.

(11) In some embodiments, in the method described in above (1) or (2), the method further includes, in the checking, determining whether the deposit can be removed by electrical discharge machining from the internal passage in which the deposit has been detected (S107), and when it is determined that the deposit cannot be removed by electrical discharge machining in the determining, the deposit adhering to the inner wall surface of the internal passage is removed by chemical polishing using an etchant in the removing.

According to the method described in above (11), the deposit is removed by electrical discharge machining when the deposit can be removed by electrical discharge machining, or removed by chemical polishing when the deposit cannot be removed by electrical discharge machining. Thus, the deposit can be removed while maintaining the surface roughness of the inner wall surface of the internal passage obtained by additive manufacturing as much as possible. As a result, it is possible to effectively cool the additively manufactured object.

Although the embodiments of the disclosure have been described above, the disclosure is not limited to the above-described embodiments, and also includes modifications of the above-described embodiments as well as appropriate combinations of the embodiments.

In the present specification, an expression of relative or absolute arrangement such as "in a direction", "along a direction", "parallel", "orthogonal", "centered", "concentric" or "coaxial" shall not be construed as indicating only the arrangement in a strict literal sense, and also includes a state where the arrangement is relatively displaced by a tolerance, or by an angle or a distance that can still achieve the same function.

For instance, an expression indicating an equal state such as "same", "equal", or "uniform" shall not be construed as indicating only a state in which features are strictly equal, but also includes a state in which there is a tolerance or a difference within a range in which the same function can be achieved.

In addition, in the present specification, an expression of a shape such as a rectangular shape or a cylindrical shape shall not be construed as only a geometrically strict shape, and also includes a shape with unevenness or chamfered corners or the like within the range in which the same effect can be achieved.

In addition, in the present specification, an expression such as "comprising", "including", or "having" one component is not intended to be exclusive of other components.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A method of manufacturing an additively manufactured object, the method comprising:

checking, for an additively manufactured object including a plurality of internal passages, presence or absence of a deposit on an inner wall surface of each of the plurality of internal passages; and selectively removing the deposit from an internal passage in which the deposit has been detected in the checking, among the plurality of internal passages, wherein in the removing, the deposit on the inner wall surface of the internal passage is removed by performing electrical discharge machining using an electrode including a base portion covered with an insulating material and a tip portion exposed without being covered with the insulating material.

2. The method of manufacturing an additively manufactured object according to claim 1, wherein each of the plurality of internal passages includes a bent portion.

3. The method of manufacturing an additively manufactured object according to claim 1, wherein the deposit on the inner wall surface of the internal passage is removed by performing electrical discharge machining in a state in which at least a part of the base portion and the tip portion are inserted into the internal passage in which the deposit has been detected in the checking.

4. The method of manufacturing an additively manufactured object according to claim 1, wherein the electrode is a deformable electrode.

5. The method of manufacturing an additively manufactured object according to claim 1, wherein the electrode is an electrode formed by additive manufacturing.

6. The method of manufacturing an additively manufactured object according to claim 1, wherein a portion of the electrode including the tip portion of the electrode has a curved shape.

* * * * *